Dec. 6, 1955 D. M. STIGLMEIER ET AL 2,726,343
VENTILATED DYNAMO ELECTRIC MACHINE
Filed June 21, 1954

INVENTORS
Donald M. Stiglmeier, Henry Muczenski
and James H. Penney.
BY
ATTORNEY

United States Patent Office 2,726,343
Patented Dec. 6, 1955

2,726,343

VENTILATED DYNAMO ELECTRIC MACHINE

Donald M. Stiglmeier, Buffalo, Henry Muczenski, West Seneca, and James H. Penney, East Amherst, N. Y., assignors to Westinghouse Electric Corporation, East Pittsburgh, Pa., a corporation of Pennsylvania Application June 21, 1954, Serial No. 437,916

4 Claims. (Cl. 310—88)

The present invention relates to the construction of dynamoelectric machines, and more particularly to an improved guard or protective means for the ventilating openings of such machines.

Dynamoelectric machines are usually ventilated by means of an internal fan or blower which circulates air through the machine, the air entering and leaving through openings in the end brackets. It is usually necessary, or desirable, to screen or otherwise guard these openings to prevent foreign objects from falling into the machine or being accidentally inserted through the openings. Wire screening is frequently used for this purpose, but the use of such screening requires extra machining of the bracket to provide for mounting the screen, as well as involving additional assembly operations to put the screen in place, thus increasing the cost. The use of wire screening also has another serious disadvantage, since even the finest wire screening available very substantially reduces the effective area of the opening, thus reducing the flow of air and impairing the ventilation.

The principal object of the present invention is to provide a dynamoelectric machine having openings for ventilating air, with simple and inexpensive guard means for protecting the openings.

Another object of the invention is to provide a dynamoelectric machine having openings for ventilating air, with guard means for the openings consisting of a plurality of spaced, parallel wires extending across the openings which can easily be put in place without special mounting means, and which do not seriously reduce the air flow through the opening because of their small size and round shape.

Other objects and advantages of the invention will be apparent from the following detailed description, taken in connection with the accompanying drawing, in which.

Figure 1:
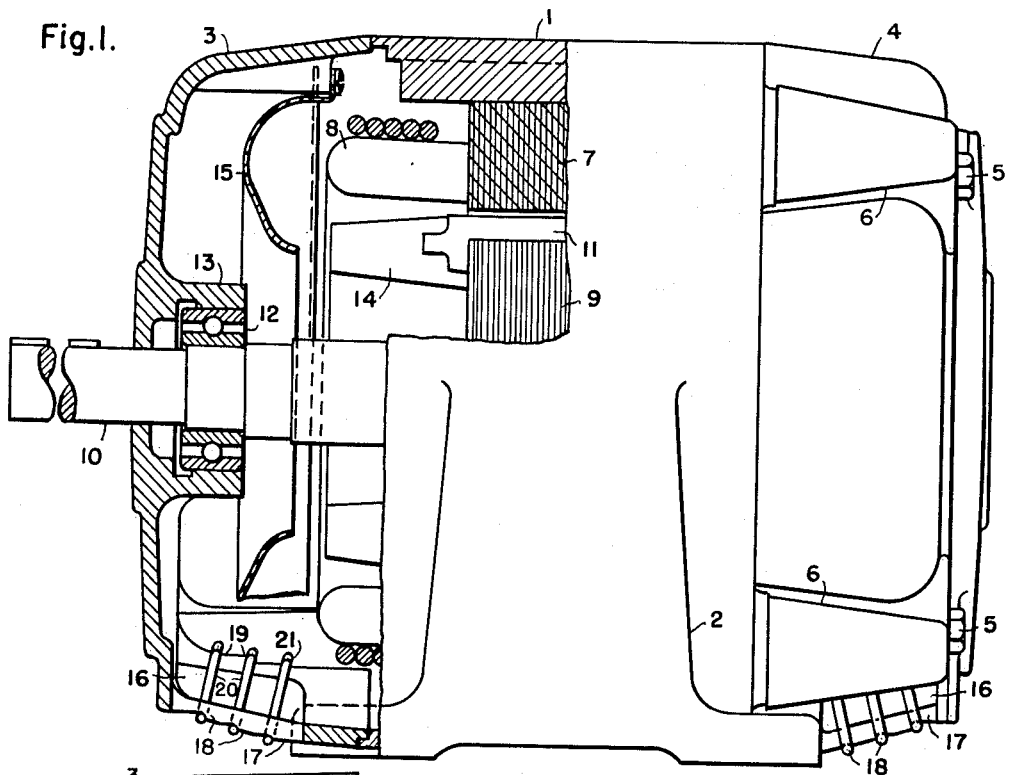
Figure 1 is a view, partly in side elevation and partly in longitudinal section, showing a dynamoelectric machine embodying the invention.

The invention is applicable to dynamoelectric machines of any type or size, and is shown in the drawing, for the purpose of illustration, applied to an alternating-current induction motor. The machine shown in the drawing has a frame member 1 with feet 2, formed integrally with the frame or welded thereto. End brackets 3 and 4, which may be of identical construction, are secured to the ends of the frame 1 by means of screws 5 passing through mounting lugs 6 into the frame. A laminated stator core 7 is pressed or otherwise secured in the frame 1 and carries primary windings 8 of any suitable type.

The machine has a rotor member including a laminated core 9 secured on a shaft 10 and carrying a secondary winding, shown as a squirrel-cage winding 11. The shaft 10 is supported in bearings 12 mounted in bearing housings 13 in the end brackets 3 and 4. The machine is ventilated by internal fan means shown as consisting of a plurality of fan blades 14 formed integrally with the rotor winding 11, although it will be understood that any type of fan or blower might be used. An air shield 15 is preferably mounted in the end bracket 3 to direct the flow of air.

Each of the end brackets has a pair of openings 16 which are positioned close together and separated by a dividing member or partition 17, which may be an integral part of the bracket. The openings 16 are preferably located at the bottom of the bracket, as shown, in order to make the machined rip-proof. The openings 16 permit the entrance and discharge of ventilating air and, as indicated above, it is necessary, or desirable, to provide guard means for preventing the entrance of foreign objects into the machine through the openings.

Figure 2:
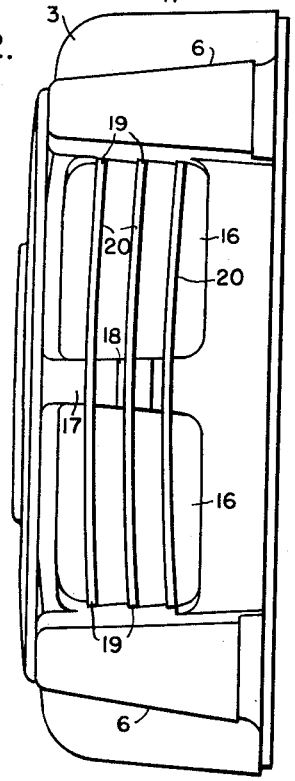
Fig. 2 is a bottom view of one of the end brackets of the machine of Fig. 1.

The present invention provides a simple and inexpensive guard means which does not seriously reduce the flow of air through the openings, so that the effectiveness of ventilation is not seriously impaired. As shown in Figs. 1 and 2, the dividing member 17 which separates the adjacent openings 16 is made of stepped configuration, having a plurality of steps 18 formed in its outer surface. The opposite edges of the openings 16 are also formed with a plurality of steps 19 on their inner surfaces, corresponding in number and location to the steps 18 of the dividing member.

Figure 3:
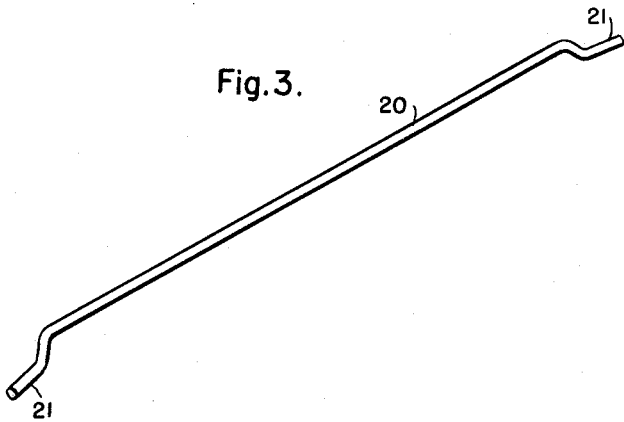
Fig. 3 is a perspective view of a guard wire.

The opening is protected by a plurality of guard wires 20, which are preferably made of spring steel wire of sufficient size to be relatively stiff, although any suitable stiff, resilient material might be used. The guard wires 20 have their ends 21 offset, as shown in Fig. 3, and are made of suitable length to extend across both the openings 16. The wires 20 are initially straight, and to put them in place in the machine, the wires are bent into an arc, which may be done by means of a simple hand tool, and are placed in the openings, as shown, with the central part of each wire engaging one of the steps of the dividing member 17 and the offset ends of the wire engaging the corresponding steps 19 of the opposite edges of the openings. When the wire is released, its spring characteristic will cause it to tend to return to its initial straight shape, and thus the wire will be firmly held in position, the steps 18 and 19 preventing movement in the axial direction, and the spring force of the wire preventing displacement or looseness. Three guard wires and three sets of steps in the bracket are shown in the illustrative embodiment, but it will be understood that any suitable number of wires and steps may be provided, depending on the axial length of the openings 16.

It will be seen that the guard wires 20 effectively prevent the entrance of foreign objects through the openings and thus provide the desired protection. The wires are quickly and easily inserted with a simple hand tool, and require no special mounting means or extra machining of the bracket, since the steps 18 and 19 can be cast in the bracket and require no machining. Thus, the cost is low and the expensive mounting means and assembly operations previously required are eliminated, as well as the expense of special brackets which have frequently been needed. The wires 20 are made as small in size as possible, consistent with the necessary stiffness, and thus do not seriously reduce the area of the openings 16 available for air flow, so that the ventilation is not seriously affected. The round shape of the wires also tends to facilitate air flow through the openings.

It should now be apparent that an inexpensive and effective guard means has been provided for the ventilating openings of dynamoelectric machines which avoids the disadvantages of the wire screening usually used heretofore. A specific embodiment of the invention has been shown and described for the purpose of illustration, but it is to be understood that the invention is applicable to dynamoelectric machines of any type or size, and that it

We claim as our invention:

1. A dynamoelectric machine having a stator member and a rotor member, the stator member including a frame and end brackets disposed at the ends of the frame, at least one of said end brackets having an opening therein for ventilating air, fan means in the machine for circulating ventilating air, and a plurality of stiff, resilient wires disposed in spaced, parallel relation and extending across said opening in the end bracket, said wires being held in place solely by engagement with the bracket.

2. A dynamoelectric machine having a stator member and a rotor member, the stator member including a frame and end brackets disposed at the ends of the frame, fan means in the machine for circulating ventilating air, at least one of said end brackets having a pair of openings therein for ventilating air, said openings being close together with a dividing member between them, and a plurality of stiff wires extending in spaced, parallel relation across both openings, said wires bearing against the dividing member and engaging opposite edges of the openings.

3. A dynamoelectric machine having a stator member and a rotor member, the stator member including a frame and end brackets disposed at the ends of the frame, fan means in the machine for circulating ventilating air, at least one of said end brackets having a pair of openings therein for ventilating air, said openings being close together with a dividing member between them, the dividing member being of stepped configuration, and a plurality of stiff wires extending in spaced, parallel relation across both openings, said wires bearing on the steps of the dividing member and engaging opposite edges of the openings.

4. A dynamoelectric machine having a stator member and a rotor member, the stator member including a frame and end brackets disposed at the ends of the frame, fan means in the machine for circulating ventilating air, at least one of said end brackets having a pair of openings therein for ventilating air, said openings being close together with a dividing member between them, the dividing member being of stepped configuration and the opposite edges of the openings having correspondingly positioned steps, and a plurality of stiff wires extending in spaced, parallel relation across both openings, said wires bearing on the steps of the dividing member and engaging the corresponding steps in the edges of the openings.

References Cited in the file of this patent

UNITED STATES PATENTS

| | | |
|---|---|---|
| 1,009,951 | Armstrong | Nov. 28, 1911 |
| 1,769,931 | Norton et al. | July 8, 1930 |